Sept. 25, 1934.    C. G. LUTTS ET AL    1,974,827
CHAIN LINK
Original Filed Sept. 23, 1930
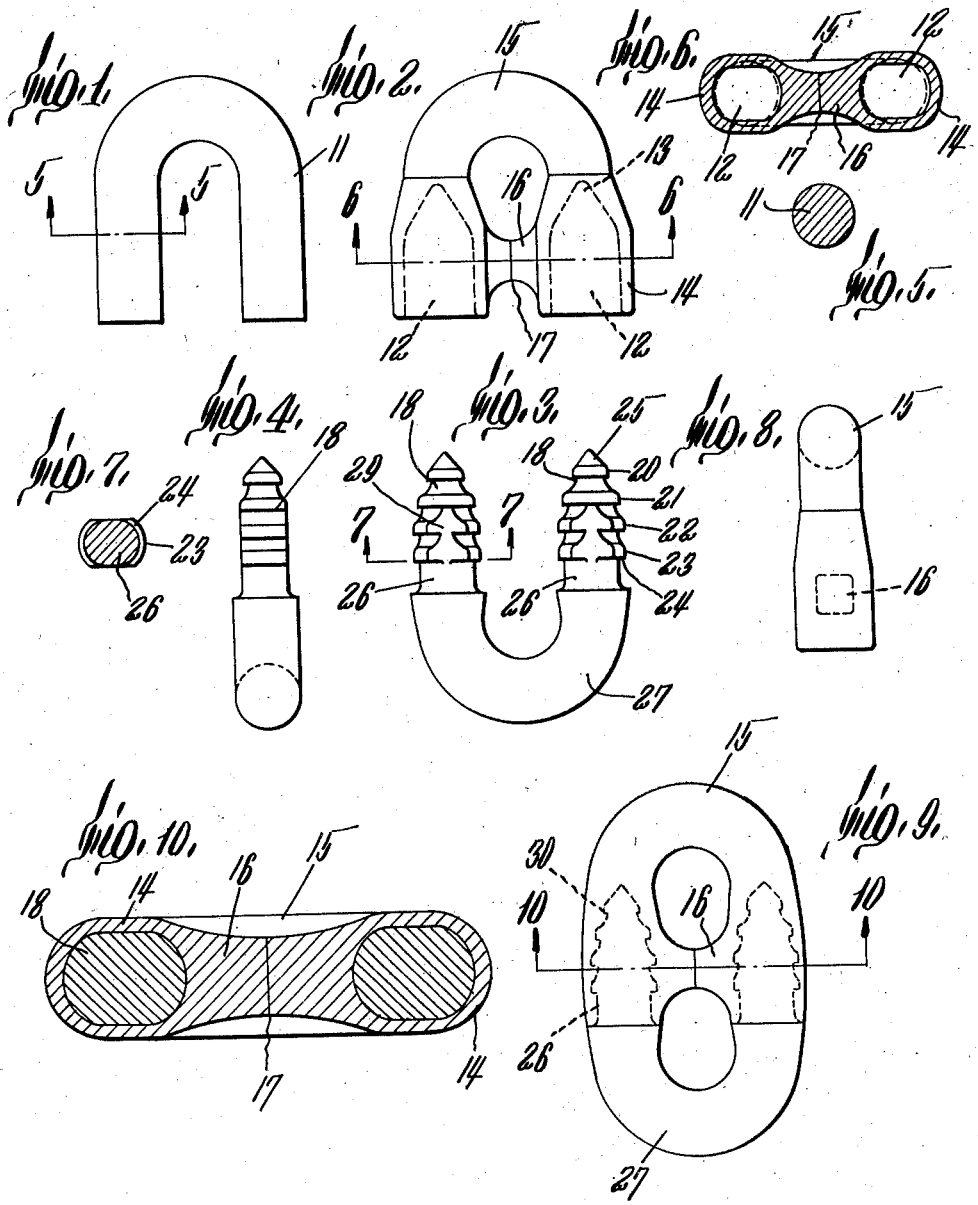

Patented Sept. 25, 1934

1,974,827

UNITED STATES PATENT OFFICE 1,974,827

CHAIN LINK

Carlton G. Lutts, Salem, and Albert M. Leahy, Somerville, Mass.

Application September 23, 1930, Serial No. 483,775
Renewed March 26, 1934

6 Claims. (Cl. 59—84)

This invention relates to a chain link for anchor cables and the like, and the method of making same. It is an object of the invention to provide a chain link which can be manufactured with others into a chain more rapidly than the ordinary welded link. It is also an object of the invention to provide a link which will be considerably stronger than the usual welded link and which will be cheaper to make. A preferred embodiment of the invention includes a stud structure for the production of a link of the stud type, the construction being such that it is impossible for the stud to work loose or fall out.

In the manufacture of chain cables, there are several difficulties which must be considered. It has been customary to make chain links of wrought iron, since this material can be strongly welded to form the closed loop for each link. The strength of a chain made of this material has a definite limitation. Although there are several forms of steel which are greatly superior in strength to wrought iron, these materials have hitherto been unavailable for chain cables owing to the impossibility of successfully welding such materials. In manufacturing stock for chain links, it is customary to roll the stock to the desired diameter, this process of manufacture resulting in a structure of the metal which resembles a fibrous structure in that tensile strength along the axis of the bar of stock is greater than the transverse tensile strength across the fiber. Hence, for maximum strength it is important that the pull be so far as possible along the axis of the stock. In making an ordinary welded link, a suitable length of wrought iron stock is bent around into the form of a loop which is slipped over the previously formed link of the chain. The open loop is then closed by welding the ends together. This results in a closed loop in which the fibrous structure of the metal follows the direction of the stock in the link. When the chain is under tension, most of the stress is in the direction of the axis of the stock. In addition to the longitudinal tensional stress on the link is a shearing stress near the ends caused by the inner engagement of the adjacent ends of successive links. For this reason, a well made link when tested to destruction will break at its quarter, that is, near the bend at one or the other of its ends, owing to the shearing stress set up by contact of the adjacent link in addition to the tensional stress on the chain as a whole. Were it not for this shearing stress, the theoretical strength of the chain would be just twice the tensile strength of the stock of which it is made since each link has two side members of such stock which share the tension on the chain as a whole. As it is, the breaking strength of a well made wrought iron chain is about 85 to 90% of twice the strength of the stock.

In the manufacture of chain links, certain other limitations must be borne in mind. These include specified dimensions which are essential for practical purposes since most chains, particularly the larger sizes, have to be capable of properly engaging in a standard wildcat such as constitutes a part of the usual windlass on the forecastle of a ship for raising the anchors. The standard chain link must have a length six times the diameter of its stock, and an over all width of about 3.6 times the stock diameter. The outer contour must be oval in form and must be free from knobs or other protuberances.

According to the present invention a chain link is provided which has a considerably greater strength than a wrought iron link of similar size, which conforms to the standard requirements as to dimensions, and which can be quickly and economically manufactured. In carrying out the invention the strength of the link is obtained by the use of rolled alloy steel stock, such, for example, as nickel steel which has a tensile strength of approximately 100,000 pounds to the square inch. If suitably heat treated, stock of this material may have a strength of approximately 150,000 pounds to the square inch and may still retain sufficient toughness for use in chain cable. Stock of this material is bent into U-shaped members, according to the invention, which are locked together in pairs to form chain links. The structure of the locks formed by the end portions of mating members of each link is so designed that the weakest point of the link is not at either lock but at the bent quarter, where it should be. The great strength of chain links made according to the invention is due in part to the fashioning of the stock in such a manner that the grain or fiber of the metal flows around following the shape of the link. Thus there is no tension across the fibrous structure and weak links arising from inner defects in the material are thus avoided. This is an important point since as a practical matter inner flaws are liable to develop in steel stock during the process of rolling. If these flaws appear on the surface of the stock they may be readily detected and the defective piece of stock may be discarded. Frequently, however, such flaws occur within the stock and cannot be detected by ordinary inspection. These flaws as a rule do not materially decrease the longitudinal tensile strength of the material but they seriously decrease the transverse tensile strength of the stock. Hence if the fiber of the stock is arranged in the link so that it follows the shape of the link, the presence of possible flaws in the stock is not objectionable in general. If, however, the stock is arranged in the link so that there is a tension transverse to the fibers, as when a link is stamped from rolled stock so that the fiber structure of the end portions of the link extends across the wire of the link, the existence of hidden flaws very materially decreases the strength of the link and renders the entire chain liable to rupture under a stress far below its expected breaking strength.

According to the present invention a two-piece link may be made of rolled alloy steel of high strength, such, for example, as nickel steel, each piece being bent into a U-shape. One of these pieces or members may be forged to shape its end portions with a general taper and with a series of ribs or collars extending partly or wholly around the end portions. This member, which may be called the male member, is preferably heat treated to a tensile strength about 50% greater than that of the air-cooled rolled stock. Since it is not necessary to reheat it in joining it to the other member in making the link, this member retains its strength in the finished link. The other member, which may be referred to as the female member, is made by bending a piece of rolled stock into U-shape, then forging the bent piece by punching a hollow cavity in each, some of the displaced metal being moved laterally to form a pair of lugs which abut each other and constitute a stud for the link. The hollows of this member are of suitable size and shape to receive the tapered end portions of the other member. In completing a link, the tapered end portions of the male member are inserted into the hollowed ends of the female member, the latter member having been suitably heated to a sufficient temperature for forging. The side walls around the hollows are then compressed so as to force the material in them into close engagement with the ribs on the tapered end members and thus to complete a lock between each pair of interengaging members which is as strong as the wire strength of the female member.

For a more complete understanding of the invention reference may be had to the detailed description thereof which follows and to the illustration thereof in the drawing, of which,—

Figure 1 is a side elevation of a piece of stock bent to U-shape.

Figure 2 is a side elevation of the female member of the link.

Figure 3 is a side elevation of a male member of the link.

Figure 4 is another side elevation of the same.

Figure 5 is a section on line 5—5 of Figure 1.

Figure 6 is a section on line 6—6 of Figure 2.

Figure 7 is a section on line 7—7 of Figure 3.

Figure 8 is an elevation of the female member shown in Figure 2, from a different angle.

Figure 9 is a side elevation of a completed link.

Figure 10 is a section on line 10—10 of Figure 9.

Referring to the drawing in detail, 11 represents a piece of cylindrical stock of suitable rolled metal such, for example, as nickel steel, which has been bent into a U-shape. It is to be understood that the invention is not limited to any particular metal but applies to any material which is capable of being forged and which preferably can be heat treated to increase its tensile strength materially. This stock preferably has a circular cross section, as indicated in Figure 5. The female member illustrated in Figure 2 may be drop forged in a suitable die, the end portions of the bent piece being hollowed as at 12, the inner ends of the hollows being tapered to a point as at 13. This forging leaves the fibrous structure in the walls 14 surrounding the hollows 12 in the general direction of the shape of the link, so that tensile stresses in the link will be in the direction of the fibrous structure in the walls 14 as well as in the bend 15. When the hollows 12 are forged, a portion of the metal in the stock is laterally displaced to form lugs 16 which abut as at 17 to form a stud for the finished link. Thus the stud is integral with the material of the link and cannot work loose or fall out. As is hereinafter set forth more fully, the lugs 16 also serve to reinforce the wall 14 and thus to increase the strength of the locks which hold together the two members forming the link.

The male member of the link illustrated in Figure 3 is likewise forged from a bent piece 11 of stock. This member has its end portions 18 somewhat reduced in diameter and generally tapered. The length of each end portion 18 is preferably about twice the stock diameter so as to provide room for a sufficient number of ribs. It is desirable for maximum strength to provide a plurality of ribs, four ribs 20, 21, 22, 23 being shown in Figure 3. Each of these ribs is made with a shoulder 24 in a plane substantially perpendicular to the axis of the end portion of the member. These shoulders are to be engaged by material of the walls 14 of the female member to form the locks holding the members of the link together. The side of each rib opposite to the flat shoulder 24 is preferably rounded or tapered to facilitate the flow of metal into the space around the necks between the ribs when the end portions 14 of the female member are forged about the end portion 18 of the male member to form the lock. For the same reason, the necks are also tapered to avoid weakening creases in the walls of the end portions 14 when forged to make the lock. The tip 25 of each end portion is preferably conical, as shown in Figure 3, the angle at the apex of the cone being preferably not greater than 140°. At the base of the tip 25 is the smallest of the ribs, the successive ribs more remote from the tip being increasingly larger in diameter except that the ribs 22 and 23 are shown as approximately equal in diameter. In forging the male end portions 18, a suitable neck 26 of reduced diameter is provided between each rib 23 and the bend 27 of the member. The cross sectional area of this neck portion is preferably from 65% to 70% of the area of the stock. These end portions 18 are also somewhat flattened, as indicated in Figures 4 and 7, so that the ribs 22 and 23 do not extend all the way around the end portions but are interrupted on each side of the member by flat faces 29. In the link as illustrated on the drawing, the minor diameter of the tapered end member 18 for the greater part of its length is about 75% of the wire diameter of the stock. This permits a substantial minimum thickness of the walls 14 which surround these end portions. After the male member has been forged to shape, it is preferably heat treated so as to increase its tensile strength to a maximum consistent with suitable toughness. In making links with the proportions illustrated on the drawing, the material should be capable of a 50% increase in tensile strength without undue diminution of toughness.

When the two members of the link are to be joined, the male member is threaded through the last formed link of the chain and the female member is heated to a forging temperature. The latter is then thrust over the cold male member and the walls 14 are drop forged to flow into the necks or constricted portions of the male member between the successive ribs thereof. This forging step is done in a suitable die which gives the link its final shape as illustrated in Figure 9. It is apparent from this figure that in the locks the weakest points of the two members will be at the neck 26 of the male member and at the point 30 of the female member where the wall 14 of this member surrounds the rib 20. According to the invention, the cross sectional area of the female member at the point 30 is about 90% of the wire area of the stock. Since the hot metal in the wall 14 is forged into close contact with the cold metal of the male member of the link, the wall 14 is chilled with sufficient rapidity to harden it to some extent. This hardening increases its strength so that at the point 30 the tensile strength of the female member is approximately equal to the wire strength of the stock at the bend 15. As previously stated, the cross sectional area of the neck 26 of the male member which must bear half of the entire tensional stress imposed upon the link since it is between the bend 27 of the male member and the nearest rib 23, is 65% to 70% of the area of the stock. According to the invention, however, the male member is heat treated so as to increase its strength 50%. This results in a tensile strength at the neck 26 approximately equivalent to the wire strength of the untreated stock of the female member. Owing to the reinforcement of each of the ribs by the gripping action of the other ribs in each lock, the points of minimum strength in the lock are the neck 26 of the male member and the point 30 of the female member, provided that the intermediate necks and ribs are properly proportioned as illustrated on the drawing. It is apparent that the strength of the lock at these two points is equal to or greater than the wire strength of the stock at the bend 15 so that if the link is tested to destruction, failure would be expected at a quarter of the female end of the link which is subjected to shearing stress in addition to tensional stress. This is where links which have been made as described have invariably failed when thus tested. It is apparent from Figure 9 that the lugs 16 which constitute the stud of the link materially reinforce one side of the wall 14. As indicated in Figures 4 and 10, the tapered end portions 18 of the male member are considerably flattened so that the portions of the walls 14 on the faces of the link can be of material thickness without causing the total thickness of each lock between the faces of the link to exceed the wire diameter of the stock. Substantial continuous thickness of the walls 14 at these points is highly important since the link is often subjected, in actual use, to bending stresses about its median transverse axis.

Owing to the fact that drop forging operations are quickly and easily accomplished, links of the type described can be made far more rapidly than welded links. For example, in the manufacture of chain cable of 3" stock, twelve links a day for welded chain is the usual average rate of construction. In making chain of the same size according to the present invention, the same number of men can make one hundred and fifty links a day. By actual test, the strength of the links made according to the invention is approximately 85% to 90% of twice the wire strength of the untreated stock such as is found in the bend 15 of the female member.

By using suitable alloys of steel with twice the tensile strength of wrought iron, the finished link of the type described shows a strength nearly double that of the welded wrought iron link of the same wire size. Furthermore, the arrangement of the metal fiber in the link and the manner of joining the link parts together make possible a degree of control in manufacture which results in a remarkable uniformity of breaking strength of the individual links, these all being within 3% of the standard prescribed for a link of any given size and material.

What we claim and desire to secure by Letters Patent is:

1. A chain link of standard proportions composed of two members of rolled alloy steel stock bent to U-shape, one of said members being heat-treated to a tensile strength about 50% greater than that of the other and having reduced tapering end portions about twice as long as the wire diameter of the stock, each said end portion having a conical tip with an apex angle of not more than 140° and a series of peripheral ribs having faces remote from the tip in planes perpendicular to the axis of said end portion, the minimum cross-sectional area of each end portion between the bend of the member and the rib nearest to the bend being from 65% to 70% of that of the stock; the other of said members having hollow end portions fitting over said tapering end portions to interlock therewith, said other member also having an integral lug projecting laterally from each of its end portions and abutting the lug on its other end portion to form a stud for the link, the cross-sectional area of the metal of each hollow end portion in the plane of the rib nearest to the conical tip being approximately 90% of that of the stock.

2. A two-piece chain link of rolled steel stock, composed of two members bent to U-shape with their ends joined so that the fiber of the metal in the link flows in a closed loop following the shape of the loop, one of said members having a pair of lugs forged from the stock thereof and integral therewith, said lugs projecting to each other across the opening of the link to form a stud.

3. The method of making a chain link of rolled alloy steel stock, which comprises bending a piece of stock to U-shape, forging the bent piece to shape the end portions to reduced tapered form with peripheral ribs, heat-treating the forged piece to an approximate 50% increase of strength, bending a second piece of stock to U-shape, forging said second piece to form hollows in its ends and to shape some of the metal of the end portions into laterally projecting lugs meeting to form a stud for the link, heating the second said piece, inserting into the hollows of its end portions the cold tapered end portions of the first said piece and pressing the metal about the hollows into intimate contact with the tapered end portions.

4. A step product in the manufacture of chain links, comprising a piece of rolled steel stock bent to U-shape and heat-treated, each end portion of said piece having a reduced tapering form about twice as long as the wire diameter of the stock, each said end portion having an oval cross-section for most of its length and a plurality of peripheral ribs each having a face remote from the end of the portion, each portion also having a conical tip of not over 140° and a reduced neck remote from said tip with a cross-sectional area of from 65% to 70% of that of the stock.

5. A step product in the manufacture of chain links, comprising a piece of rolled steel stock bent to U-shape and heat treated, said piece having reduced tapered end portions each about twice as long as the diameter of the stock, each said end portion having a plurality of ribs transverse with respect to its length and an oval cross-section the minor diameter of which is approximately 75% of the stock diameter for the major portion of the length of each said end portion.

6. A step product in the manufacture of a chain link, comprising a piece of rolled metal stock bent to U-shape, the ends of said piece having hollows extending thereinto in the direction of the axis of each end portion of the piece, said hollows tapering to a point, and a pair of lugs integral respectively with said end portions and projecting laterally therefrom to abut each other and to form a stud for the finished link.

CARLTON G. LUTTS.
ALBERT M. LEAHY.